Nov. 6, 1962
W. A. MARTIN
3,062,102
MECHANISM FOR OPERATION OF ZOOM LENS
Filed Nov. 25, 1959
4 Sheets-Sheet 1
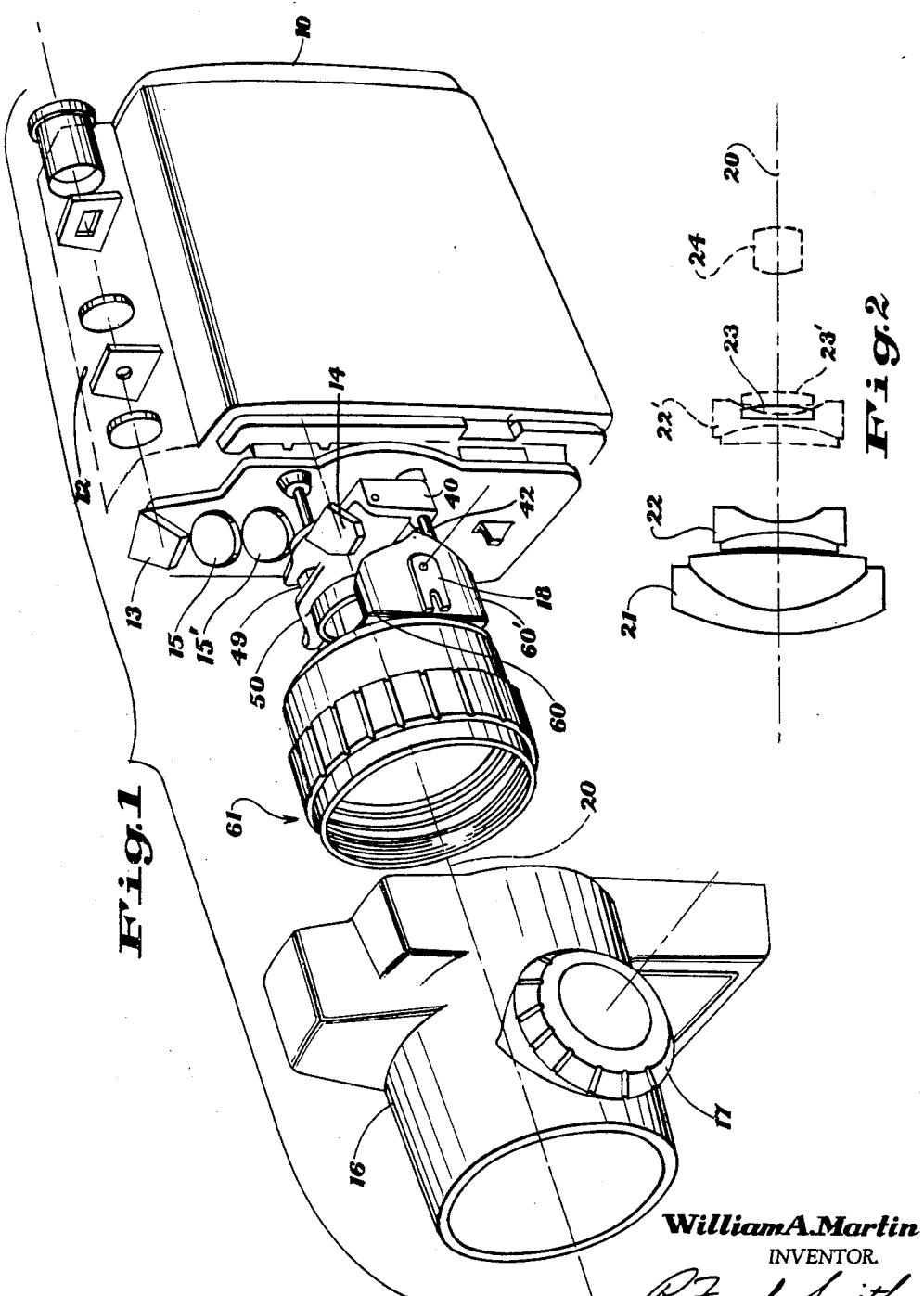
William A. Martin
INVENTOR.
BY R. Frank Smith
F. M. Emerson Holmes
ATTORNEYS

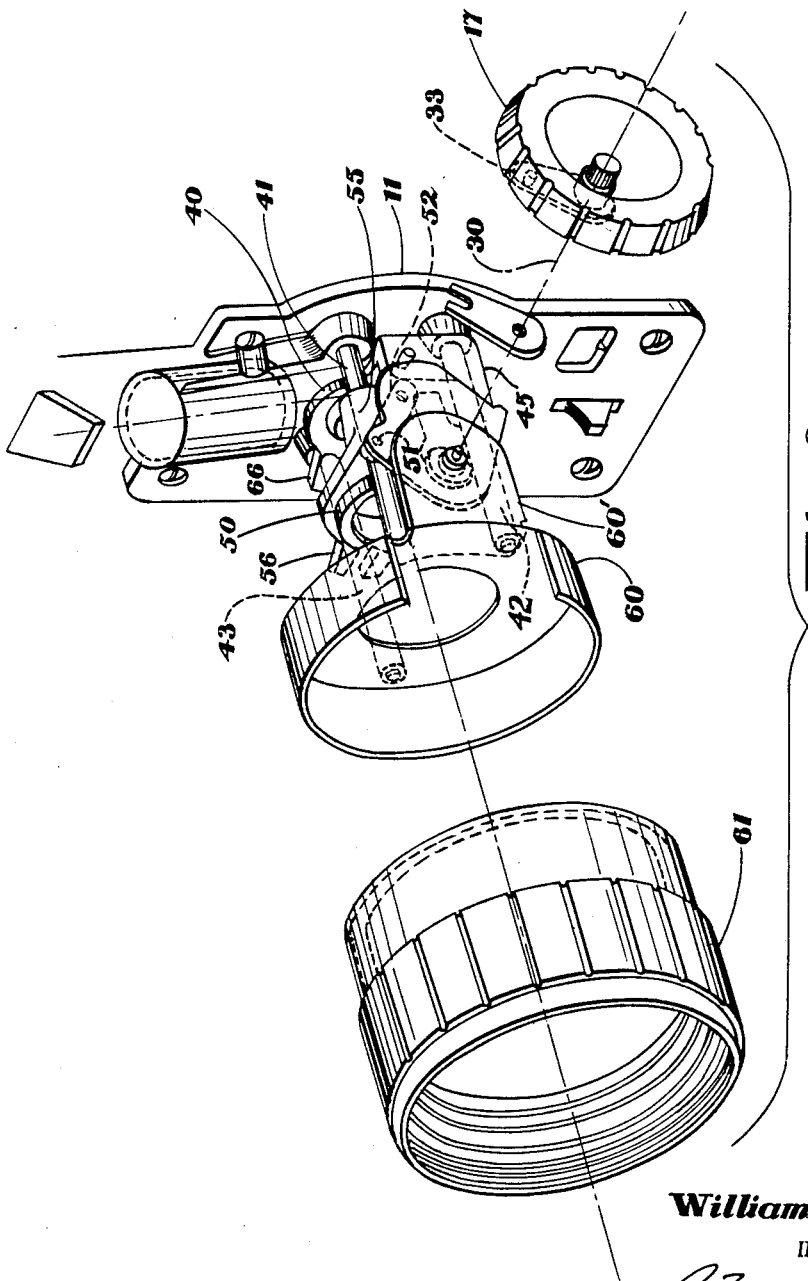

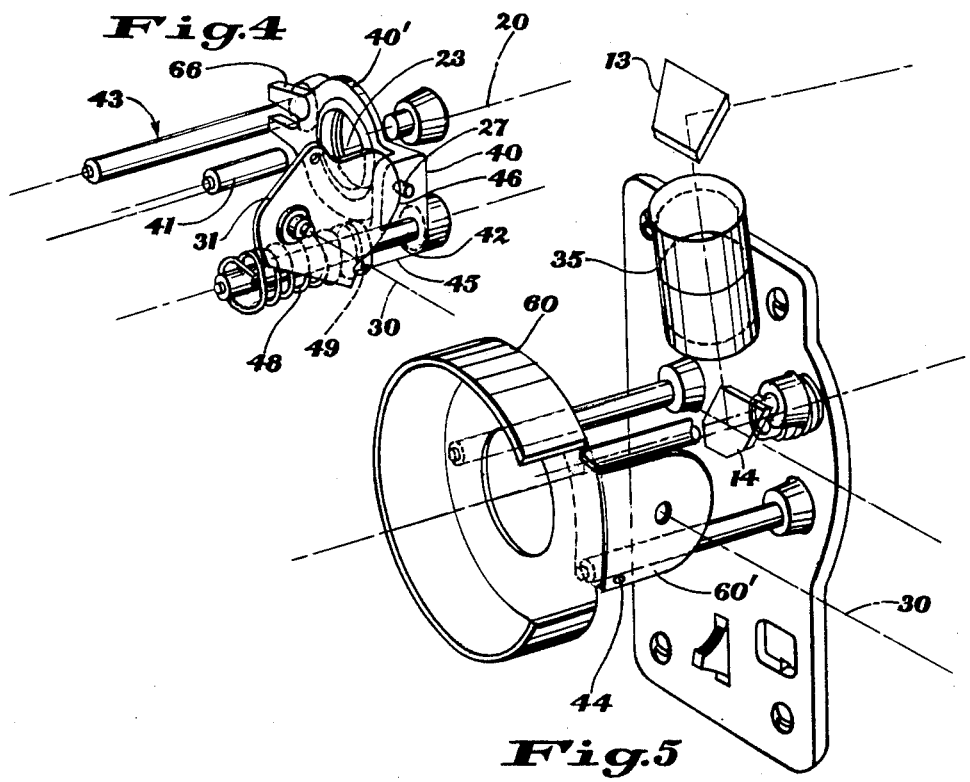
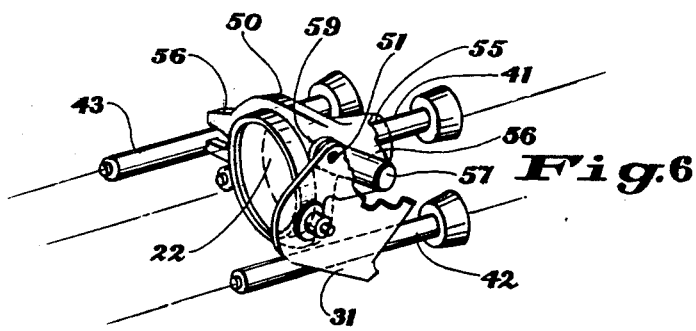

Nov. 6, 1962 W. A. MARTIN 3,062,102
MECHANISM FOR OPERATION OF ZOOM LENS
Filed Nov. 25, 1959 4 Sheets-Sheet 4

William A. Martin
INVENTOR.

BY
ATTORNEYS

United States Patent Office 3,062,102
Patented Nov. 6, 1962

3,062,102
MECHANISM FOR OPERATION OF ZOOM LENS
William A. Martin, Rochester, N.Y., assignor to Eastman Kodak Company, Rochester, N.Y., a corporation of New Jersey
Filed Nov. 25, 1959, Ser. No. 855,415
3 Claims. (Cl. 88—57)

This invention relates to photographic cameras and specifically to a mechanism for the operation of a zoom or pancratic lens.

The object of the invention is to provide a mount and operating mechanism for a zoom lens which is inexpensive to make and convenient to use, particularly in motion picture cameras but also in still cameras.

A particular object of the invention is to provide a mount and operating mechanism for a zoom system comprising three lens members of which the front one is movable for focusing on different object distances and the rear two are differentially movable for zooming. The zoom system may equally well be an afocal attachment for mounting in front of the objective of a camera or a complete image-forming zoom system depending upon the powers of the optical members. In the example shown, it is an afocal attachment for use with a standard objective. Alternatively, the attachment in combination with the objective can be designated as an image-forming zoom system.

An ancillary object of the invention is to provide a mechanism for operation of a zoom lens which is convenient to operate by hand with a minimum of friction, smoothly and without jumping.

Variable systems, called pancratic or zoom lenses, are well known and certain basic principles have been thoroughly worked out. It is known that in any optical system it is necessary to have two elements movable along the optical axis to change the magnification or focal length of a system continuously and to maintain the image in focus at all times throughout the range. The simplest example, not generally classified as a zoom system, is an enlarged camera in which the objective and the focal plane are the two movable elements. Since, in many cases, it is not convenient to vary the location of the focal plane relative to the lens, zoom systems have been developed in which two lens members are moved differentially to change the focal length of the lens system or its magnification. These two lens members may constitute the only moving parts of the system but it is sometimes convenient to have the third member also movable for focusing, and the operating mechanism according to the present invention is useful in operating either a two-member system or a system having more than two members. It is particularly useful in systems in which two optical members are required to be moved, one of them being moved several times as far as the other.

According to the present invention a mount and operating mechanism is provided for a zoom lens system which comprises a plurality of lens members in alignment on a common optical axis, including two members axially movable for zooming. The mounting and guiding means for each of the two movable members is adapted to maintain its respective lens member in precise axial alignment while allowing controlled axial movement for zooming. As the zoom system is adjusted through its range from minimum to maximum magnification, or the reverse, one movable lens is moved continuously in one direction, whereas the other movable lens is moved first backward to a rearmost position and then forward again, moving a smaller distance than does said one lens. The mechanism contains a cam rotatable about a transverse axis and a cam follower coupled to said other movable lens mount. The cam follower is preferably on the mount itself but may be linked thereto through a lever. This cam arrangement provides the necessary back and forth motion of said other lens as the cam is rotated in one direction. Attached to the cam is a crank means coupled to the mount of said one lens member to move it continuously in one direction as the cam is rotated in one direction. The cam is shaped and the crank dimensioned to relate the motions of the two movable lens members so that the focus of the system does not change as the system magnification is changed. The crank and cam combination provides smooth zooming both forward and back when the cam is rotated in either direction, provided that the guiding and mounting means for the lens components are smooth and precise.

According to a preferred form of the invention, the zoom lens system comprises at least three members of which the front one is either fixed or independently adjustable for focusing to different object distances and the other two members distinct from said front member are movable for zooming. The mounting and guiding means for the two movable lens members comprises three or more slide bars or rods parallel to the optical axis and spaced around it, and the movable lens members are carried in mounts which slide along the slide bars and are held in axial alignment by the slide bars. In one embodiment three rods are used with each of the two zooming members supported primarily by a different rod, the third rod providing alignment guidance for both members to prevent rotation of each lens member around its support rod. This arrangement makes it possible to provide one relatively long bearing surface for each lens mount on its own rod, to prevent tilting of the lens axis relative to the system axis, and still move the lens close together during zooming. The shorter bearing surface (for alignment guidance) of both mounts is on the third rod or, if four or more rods are used, may be on separate rods. The three or four rods may also support the fixed or non-zooming lenses of the system. The cam and crank arrangement of the present invention is quite simple and rugged when combined with this three-rod or four-rod guiding arrangement; it is much more complex when used with the usual sleeve mountings.

In a particularly useful form of the invention the zoom system consists of three lens members constituting an afocal attachment of variable power adapted to be mounted in front of a camera objective, the front member being movable for focusing, the second member being movable by said crank means and the rear member being movable by said cam means.

In the accompanying drawing:

FIG. 1 is a partly exploded perspective view of a zoom lens system according to the invention, mounted on a motion picture camera.

FIG. 2 is a diagrammatic axial section of the optics of a zoom lens system suitable for use with the invention.

FIG. 3 is a partly exploded perspective view of the zoom mechanism with the front cover removed.

FIG. 4 is a detail of the cam means and the lens member movable by cam action.

FIG. 5 is a detail of the slide rods showing the mounting bracket for the front normally stationary member.

FIG. 6 is a detail of the lens member movable by the crank means.

Figure 7:
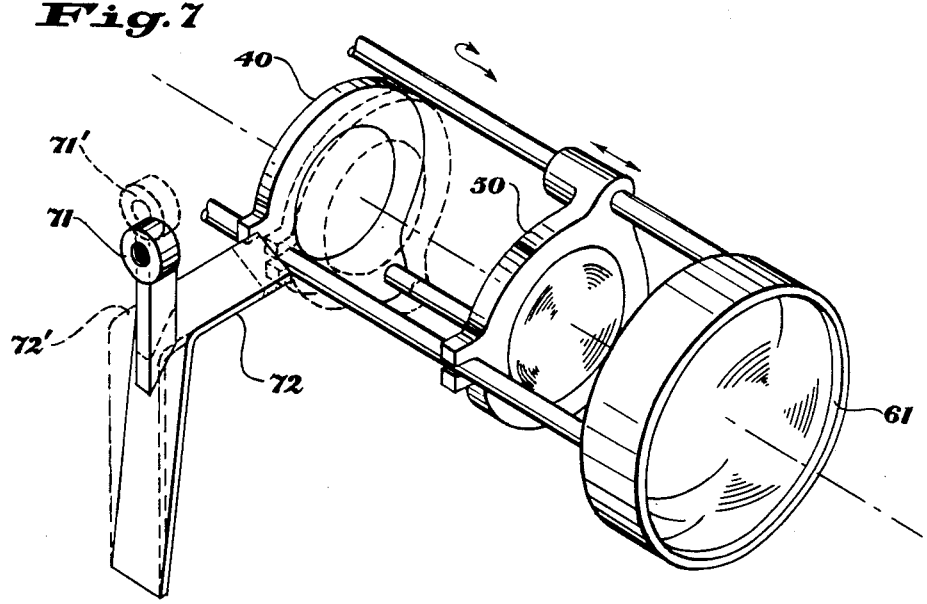
FIG. 7 is a detail of an optional method of focusing for near and far objects.

FIG. 1 is an over-all partly exploded view of a motion picture camera embodying the invention. The camera body 10 is provided with a front plate 11 on which are mounted the three slide rods 41, 42 and 43. Along the top of the camera is a telescopic viewfinder 12 the axis of which is reflected downward by a mirror 13 and again reflected into coincidence with the optical axis 20 of the zoom system by a partly transparent mirror 14. Two lenses 15 and 15' of the viewfinder system are located between these two mirrors. On the three slide rods are mounted the two zooming members in mounts 40 and 50 and attached to the front ends of the three slide rods is a bracket 60, shown in more detail in FIG. 5, for the focusing lens and the focusing ring 61. The bracket 60 has a turned ear 60' to provide support for the transverse mechanical axis of the zoom operating mechanism. When the zoom mechanism is completely assembled a cover 16 is placed in position and a manual control knob 17 is attached and fastened to the operating lever 18.

In FIG. 2 is a diagrammatic axial section of a particular lens system suitable for use with the mechanical mount and control according to the invention. This lens system is described in greater detail in concurrently filed application, Serial No. 855,429, filed November 25, 1959 by W. A. Price. A front positive member 21 is normally stationary but movable for focusing and for manufacturing adjustment. A negative member 22 is in the position of 22 shown in full lines when the system is adjusted for magnification of 0.65 and in the position shown by dotted lines 22' when adjusted for magnification of 1.9. A third member 23 is a positive single lens and is in the position shown in full lines when at or near either end of the range of adjustment of magnification and in the position 23' shown by dotted lines when adjusted for magnification of about 1.05. These members are mounted in front of a standard objective 24 and all are in optical alignment on the optical axis 20. The optical axis is actually displaced sideways by the diagonal mirror 14 which is omitted from this figure for simplicity but which in a complete camera is in the space between lens 23 and the standard objective lens 24. The objective lens is focused approximately for its hyperfocal distance before the afocal zoom system is assembled in front of it.

When a lens is focused on its "hyperfocal" distance, all objects from one half that distance to infinity are within the depth of field, i.e. are imaged satisfactorily. With accepted standards of good resolution and good correction for aberrations, hyperfocal distance is a function of the focal length and relative aperture of the lens. The hyperfocal distance of a typical short focal length high aperture lens used in movie cameras is about 22 feet. It is customary to focus "fixed focus" cameras at the hyperfocal distance. In this particular lens system the first two members are cemented achromatic doublets and the third member is a simple positive lens element. Other combinations however are known and may be optionally used.

FIG. 3 is a partly exploded view of the zoom mechanism with its control knob and the focusing ring. The zoom mechanism is mounted on three rods 41, 42 and 43 shown in greater detail in FIGS. 4 and 5, and these rods are supported by the front plate 11 of the camera. The mount 40 of the rear lens member of the zoom system is slidably mounted on rods 42 and 43 and the mount 50 of the second or middle member of the zoom system is slidably mounted on rods 41 and 43. Each mount is provided with a sleeve 45 and 55 respectively on the respective rods 42 and 41 of sufficient length to prevent tilting of the mounting member and each is provided with a yoke sliding on rod 43 for preventing rotation around the other rod. These yokes can be very thin so that the two mounting members can approach very close to one another. The front lens member is mounted in a bracket 60 which can conveniently be made by pressing sheet metal into a cup shape except that one sector of the rim of the cup of about 30 to 50° is separated from the rest of the rim and bent back as a tab 60' to provide a mount for the transverse mechanical axis on center line 30. As above-mentioned, the bottom of this cup-shaped mount is attached to the ends of the three rods 41, 42 and 43 in any convenient manner. The front lens member of the zoom system is mounted for focusing in the lens mount 60 in any known manner and is provided with a focusing ring 61. Since the manner of mounting the front lens member for focusing and manufacturing adjustment is not a part of this invention, it is not shown in the drawing.

The essence of the invention lies in the mounting of the two movable lens mounts slidably on the three rods abovementioned and in the control mechanism mounted on the transverse axis on center line 30. This control mechanism includes a cam plate 31 mounted for rotation on said transverse axis through an angle of roughly 90° or perhaps a little more, under the control of the manually operated knob 17. For ease in assembly, a clip or yoke member 18 (FIG. 1) is mounted on the transverse axis and attached to the cam member so that the two turn together and the knob 17 is provided with an eccentric pin 33 which is inserted into the notch of the yoke during assembly so that the knob then is used to turn the cam plate.

FIG. 4 shows the mechanism for moving the rear lens mount separately from the remainder of the mechanism. The three slide rods 41, 42 and 43 are as shown in FIGS. 1 and 3, except that rod 41, which is not used in supporting the rear lens mount, is broken away to show this lens mount more clearly. This rear lens mount 40 includes a plate portion 40' extending transversely of the optical axis 20 and a sleeve portion 45 attached thereto by a tab 46 and adapted to slide on the rod 42, and a yoke 66 sliding on rod 43 for preventing rotation around rod 42. On the tab portion 46 is a pin 47 which bears against the edge cam of the cam plate 31 for imparting the predetermined motion to the rear lens mount 40 during zooming. In order to urge the pin 47 against the cam plate 31 resiliently, a spring 48 is wound around rod 42 and one end is threaded over boss 49 on the sleeve portion 45 of the rear lens mount to attach it thereto. The other end is secured to a hole 44 in the mounting bracket tab 60' shown more clearly in FIG. 5. The spring is stretched during assembly of the apparatus and put under tension to supply the force holding the pin 47 against the cam plate 31.

FIG. 5 is a perspective view of the framework of the zoom lens mechanism with the two movable lens mounts removed. The mounting bracket 60 for the front lens member is mounted on the front ends of the three slide rods 41, 42, 43 by riveting or in any convenient way. This mounting bracket is a generally cup-shaped member which conveniently may be punch-pressed out of sheet metal and is provided with a hole in the bottom of the cup through which the image-forming beam of light passes. The bottom of the cup is attached to the three slide rods as above-mentioned and one sector of the rim portion of the cup is separated from the remainder of the rim portion and is turned back in the opposite direction to form the mounting tab 60' for the transverse axis 30 and also for the hole 44 into which the tension spring 48 (FIG. 4) is hooked. The front lens mount 61 (FIG. 3) is held in the mounting bracket 60 in any known manner to provide axial movement for focusing.

FIG. 6 shows the mount and mechanism for moving the middle lens member in a partly exploded view and removed from the rest of the apparatus. The same three mounting rods 41, 42 and 43 are shown as in FIG. 4. In this case the lens mount is made to slide on rod 41 and for this purpose the lens mount 50 is provided with an extended sleeve portion 55 of sufficient length so that the lens mount cannot tilt and a yoke 56 is provided which slides on the other rod 43 and prevents rotation of the lens mount around the rod 41 and thereby maintains the lens member centered on the optical axis 20. This is the same type of mount as used for the rear lens member except that it is mounted on a different rod and the sleeve portion extends backward rather than forward. In this way, by using two separate rods and making the collar portions to extend in opposite directions, a very compact arrangement is obtained and the two end members are easily and conveniently slid very close together during the zooming adjustment of the system to the higher magnification end of the range. This middle lens mount shown in FIG. 5 is not under spring tension but is positively moved in both directions by link 56 which is attached at one end of the collar 55 of the lens mount by means of a pin 57 and at the other end to an eccentric hole 51 near the upper edge of the cam plate 31 by means of pin 59. When the cam plate is turned by turning knob 17 (shown in FIG. 1) the link is pulled or pushed and it in turn pulls or pushes the middle lens mount 50 through the required range and reaches a positive stop at each end of the range when the sleeve 55 reaches the end of the rod 41.

In designing the cam, the easiest procedure results if pin 47 (FIG. 4) is located in the same horizontal plane as the transverse axis 30. When this arrangement is used the lever arm measured from the axis 30 to the pin 59, the length of the link 56 measured from the pin 59 to the pin 57, and the distance of the pin 57 above the horizontal plane to the transverse axis 30 provide all the factors that are needed to be known to relate the position of the mount 50 to the angular position of the cam plate 31 by using ordinary trigonometric methods. Moreover a direct trigonometric solution can be made and one does not need to resort to the more laborious method of successive approximations. If then the positions of the lens mount 50 are related in this way to the angular position of the cam plate 31, the corresponding positions of the rear lens mount 40 are computed by known optical equations, either directly or by a series of approximations, and a series of points on the cam sector of the cam plate 31 is laid out. Now if the pin 47 is in the same horizontal plane as the transverse axis 30 then the radius of a point on the cam is obtained directly from the optically computed position of the rear lens mount 40. Otherwise it is the hypotenuse of a right triangle, and that requires a slightly more complicated computation. In either case, a series of radii is computed and the cam curve laid out smoothly through these points.

In long focus lenses, a focusing scale marked in feet or meters is customarily provided but in short focal length lenses where the depth of field is greater, it is often sufficient to provide three or even as few as two detent stops marked far and near or far, medium and near.

FIG. 7 shows an optional focusing mechanism which is especially suitable for use in short focal length systems. This optional focusing means is based in its manner of operation upon the well-known fact that the depth of field of a lens of a given $f$ number is less the longer the focal length. Thus, while the zoom system may focus satisfactorily from infinity down to say 6 feet when adjusted for short focal length (called the wide field position), it would cover only a portion of this range when adjusted for a long focal length (called the telephoto position). Accordingly, what is desired is a device which will not affect the operation of the zoom system when adjusted for short focal length but which will give two focusing positions, "far" and "near," when adjusted for long focal length.

FIG. 7 is a schematic diagram showing the three lens mounts 45, 50 and 61 mounted on the three slide rods 41, 42, and 43. The middle lens mount 50 slides forward for the short focal length adjustment and to the rear for the long focal length adjustment. The rear lens mount 40 slides from its short focal length position somewhat to the rear and at an intermediate focal length position it becomes momentarily stationary and then for a longer focal length adjustment it slides toward the front again and continues to a position farther to the front for the longest focal length position than the original short focal length position. These movements are indicated schematically by the arrows above the two movable lens mounts. According to the optional method of focusing a manually operated button 71 is provided which is pushed into the position shown in full lines for a near object distances and is pulled upward to the position shown on dotted lines 71' for far objects. Then by any known mechanism, a detent 72 is pushed into the position shown in full lines when the manually operated button 71 is set for near objects. The detent 72 in this position blocks the forward movement of the rear lens mount 40 at some selected point between the two positions at the ends of the normal range of adjustment. When the manually operated button is adjusted to the "far" position 71', the mechanism then removes the stop or detent 72 from the path of the mount 40 of the rear lens component to the position 72' indicated by dotted lines so that it operates normally throughout the full range of zooming adjustment and is focused for distant objects. In the "near" position 71 however, the stop 72 blocks the forward movement of the rear lens member and hold it in a position in which the zoom system is focused more sharply for near objects when in the long focal length adjustment. It will be noted that this stop 72 may be placed in operating position and if intentionally or unintentionally it is left there, it has no effect on the operation of the zoom system at intermediate or short focal length but only at or near the longest focal length of the range of adjustment of the apparatus. It will be recalled that the mount 40 of the rear lens member is spring-urged forward as shown in FIG. 4 and that the stop 72 merely works against the tension of this spring. The position normally taken by the rear lens mount 40 when adjusted for long focal length is indicated in dotted lines.

The front lens mount 61 is usually fixedly mounted in the bracket 60 when this optional method of focusing is used, but may still be movable for focusing on near distances or for manufacturing adjustment.

Figure 8:
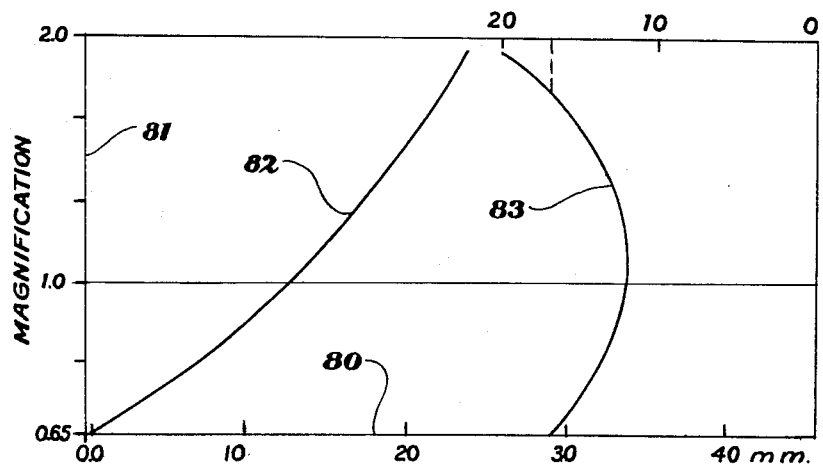
FIG. 8 is a graph showing the relative lens movements required for zooming.

FIG. 8 is a graph showing the movements of the two movable lenses. On the main horizontal axis 80 a scale of millimeters is laid out, and on the vertical axis 81 a longarithmic scale of magnification. The movement of the second lens member 22 is indicated by a sloping curve 82 and that of the third lens members 23 by a bowed curve 83. The specific data indicated by the scale 80 are the axial length of the front airspace between components 21 and 22 in the case of curve 82 and the sum of the front two airspaces in the case of curve 83. An auxiliary scale at the top of the graph gives (with reference to curve 83) the length of the third airspace. Of course, these specific values will be different with different specific lens systems with which the invention is used.

Behind the afocal portion of the zoom system in FIG. 6 is shown a partially transmitting mirror 14 which preferably is constructed as described in a concurrently filed application Serial No. 855,402, filed November 25, 1959 by Morris E. Brown and myself. This mirror reflects a portion of the light upwards and slightly to the front through the lens system of the telescopic viewfinder, the two foremost lenses of which are mounted in the lens tube 35. The second mirror 13 then reflects the light back horizontally again and backward to the remainder of the finder system (shown in FIG. 1). The mount of the main objective 62 is shown behind the partially transmitting mirror and is of any conventional type. The advantage of an afocal zoom system in combination with a finder of this type is that the view seen in the viewfinder corresponds to the field of view which will be photographed at any setting of the zoom system.

The use of three rods spaced around the optical axis for mounting the movable members of the zoom system is particularly economical and favorable to use in combination with a viewfinder system of the type in which a partially transparent mirror is mounted at an angle of approximately 45° to the axis behind the afocal part of the zoom system because the mount of the finder with its mirror is so easily inserted between two of the rods. The slide rods also have much less friction than the usual lens tubes which are mounted concentrically with the lens axis and make this mechanism extremely easy and simple to operate.

Having now described a preferred embodiment of the invention which is economical to manufacture because of the simple and acurate means of maintaining the two optical members in axial alignment and the single member which is used to move one of the movable members by cam action and the member with the greater range of movement by crank action, and the method of mounting on three rods whereby the two members are made up in a very simple form which will slide close to each other during the zooming adjustment and whereby friction is greatly reduced, all in accordance with the objects of the invention, it is pointed out that the invention is not limited to the exact form or forms shown but is of the scope of the appended claims.

I claim:

1. For use with a zoom lens system having an optic axis and a plurality of lens members in axial alignment on said optic axis, two of the members being axially movable at different rates for zooming through a range of magnifications from a minimum to a maximum, a mechanism for zooming operation of the system comprising a mount for each of said two members, guiding means comprising at least three fixed slide bars parallel to and spaced apart around the optic axis of the lens members, each of said mounts including a long bearing surface on one bar not engaged by the other mount and a shorter bearing surface on another bar, a cam follower extending in a direction transverse to the optic axis from one of said mounts and a crank lever coupled to a transversely extending portion on the other of said mounts, flat cam means rotatable about an axis transverse to said optic axis including said crank and a cam engaging said cam follower, the cam being shaped to move said one mount back and forth as the magnification is changed in one direction through its range, the crank being dimensioned and coupled to move said other mount through a greater distance than said one mount and in one direction only as the magnification is changed in one direction, said cam and crank also being shaped and dimensioned to maintain the said two lens members in the relation to the other members which maintains the focus of the system constant as the magnification is changed.

2. For use with a zoom lens system comprising a front positive lens member which is normally stationary, a negative second lens member which is movable, a positive third lens member which is movable, and a rear positive lens member which is normally stationary, a mechanism according to claim 1 in which the lens mount to which the crank lever is coupled carries the negative second lens member and the lens mount to which the cam follower is coupled carries the positive third lens member.

3. A mechanism according to claim 2 including means engaging all three of said bars for movably mounting the front normally stationary lens member to permit axial movement of this front lens member for focusing to different object distances.

References Cited in the file of this patent

UNITED STATES PATENTS

| | | |
|---|---|---|
| 2,165,341 | Capstaff et al. | July 11, 1939 |
| 2,924,146 | Back | Feb. 9, 1960 |
| 2,937,572 | Yamaji | May 24, 1960 |
| 2,969,008 | Ferrari et al. | Jan. 24, 1961 |

FOREIGN PATENTS

| | | |
|---|---|---|
| 362,789 | Great Britain | Dec. 10, 1931 |
| 810,152 | Great Britain | Mar. 11, 1959 |
| 725,513 | France | Feb. 15, 1932 |
| 1,167,796 | France | Aug. 18, 1958 |

OTHER REFERENCES

SOM-Berthiot, "Pan-Cinor 4 Reflex" (advertising leaflet).